(12) United States Patent
Muraguchi et al.

(10) Patent No.: US 7,164,530 B2
(45) Date of Patent: Jan. 16, 2007

(54) POLARIZING FILTER AND OPTICAL DEVICE USING THE SAME

(75) Inventors: Isao Muraguchi, Osaka (JP); Terufusa Kunisada, Osaka (JP); Yukinari Sekiguchi, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 37 days.

(21) Appl. No.: 10/946,316

(22) Filed: Sep. 22, 2004

(65) Prior Publication Data

US 2005/0041291 A1   Feb. 24, 2005

Related U.S. Application Data

(62) Division of application No. 09/940,716, filed on Aug. 29, 2001, now Pat. No. 6,967,776.

(30) Foreign Application Priority Data

Aug. 30, 2000  (JP) ............................ P2000-261284

(51) Int. Cl.
   *G02B 5/30* (2006.01)
   *G02B 27/28* (2006.01)
   *G02B 1/10* (2006.01)

(52) U.S. Cl. .................. 359/498; 359/488; 359/485; 359/583; 359/586; 359/588

(58) Field of Classification Search ............. 359/487, 359/488, 495, 583, 586, 588
   See application file for complete search history.

(56) References Cited

U.S. PATENT DOCUMENTS

| | | |
|---|---|---|
| 2,403,731 A | 7/1946 | MacNeille |
| 3,743,380 A | 7/1973 | Fugitt |
| 4,320,936 A | 3/1982 | Sawamura |
| 4,367,921 A | 1/1983 | Sawamua et al. |
| 4,556,599 A | 12/1985 | Sato et al. |
| 4,609,258 A | 9/1986 | Adachi et al. |
| 4,733,926 A | 3/1988 | Title |
| 4,966,438 A | 10/1990 | Mouchart et al. |
| 5,400,179 A | 3/1995 | Ito |
| 5,453,859 A | 9/1995 | Sannohe et al. |

(Continued)

FOREIGN PATENT DOCUMENTS

DE   3324059   7/1983

(Continued)

OTHER PUBLICATIONS

European Search Report dated Oct. 14, 2003.

*Primary Examiner*—Ricky D. Shafer
(74) *Attorney, Agent, or Firm*—Whitham, Curtis, Christofferson & Cook, PC

(57) ABSTRACT

A polarizing filter has a laminate structure: wherein one to four layers of first dielectric thin films 1 and one to four layers of second dielectric thin films 2 are alternately laminated on a transparent flat substrate 10 to form the laminate structure, the layers of second dielectric thin films 2 having a refractive index lower than that of the first dielectric thin films 1 with respect to the wavelength of incident light; wherein one layer of the third dielectric thin film 3 having a refractive index intermediate between the refractive indices of the first and second dielectric thin films with respect to the wavelength of incident light is laminated on a surface of the laminate structure.

In an optical device using the polarizing filter, the angle of incidence is set to be in a range of from 20 to 70 degrees.

5 Claims, 9 Drawing Sheets

U.S. PATENT DOCUMENTS 5,661,602 A    8/1997   Matsuda et al.
5,699,187 A *  12/1997  Fukushima et al. ......... 359/583
5,822,124 A    10/1998  Matsuda et al.
6,014,255 A *  1/2000   Van Der Wal et al. ..... 359/487
6,967,776 B1 * 11/2005  Muraguchi et al. ......... 359/498

FOREIGN PATENT DOCUMENTS

EP    02225345    9/1990
FR    2 713 624   12/1993

* cited by examiner

POLARIZING FILTER AND OPTICAL DEVICE USING THE SAME

RELATED APPLICATION

This application is a divisional of application Ser. No. 09/940,716 filed Aug. 29, 2001, now U.S. Pat. No. 6,967,776 the contents of which are incorporated herein by reference.

BACKGROUND OF THE INVENTION

The present invention relates to a polarizing filter used for controlling a state of polarization of light to be dealt with, and an optical device using the polarizing filter in an optical technology field such as optical communication, an optical sensor, an optical measuring device, and so on.

In an optical system applied to optical fiber communication or the like, incident light propagated through an optical fiber often contains an s-polarized light component and a p-polarized light component in an unequal intensity ratio. It is therefore necessary to provide a polarizing/optical device having a function for compensating for such incident light into a state of non-polarized light equal in the intensity ratio of the s-polarized light component to the p-polarized light component or for polarizing non-polarized incident light to obtain a desired intensity ratio of the s-polarized light component to the p-polarized light component.

As the optical device for controlling a state of polarization of incident light, there is well known a polarization beam splitter having a configuration in which tens of layers of high-refractive-index materials and low-refractive-index materials are laminated alternately on a transparent prism or on a flat transparent substrate. The polarization beam splitter can transmit only the p-polarized light component while it can cut off the s-polarized light component perfectly because an optical multilayer film satisfying the Brewster condition is provided in the polarization beam splitter.

Because such a polarization beam splitter uses light reflected or transmitted at the Brewster angle, the polarization beam splitter is allowed to use light narrow in the wavelength range, but can obtain the excellent degree of polarization in each of reflected light and transmitted light, high mass-production characteristic and is inexpensive in cost, compared with a polarizer using birefringence of a crystal such as a Nicol prism. For this reason, the polarization beam splitter is used popularly.

Because the polarization beam splitter is a device provided for separating incident light into the s-polarized light component and the p-polarized light component perfectly, the polarization beam splitter is, however, unsuitable for compensation for polarized light to obtain light with a desired intensity ratio of the s-polarized light component to the p-polarized light component.

On the other hand, it is known that the transmittance ratio of the s-polarized light component to the p-polarized light component varies when light is made incident obliquely on a transparent flat plate such as a glass plate. A polarizing filter using this characteristic is rather suitable for light compensation than the polarization beam splitter.

In order to make the degree of polarization high by using such a transparent flat plate, it was, however, necessary to make the incident angle (an angle between incident light and a line normal to the transparent flat plate on which the light is incident) large. When the transparent flat plate was used as an optical device, there was a problem that the size of a housing for the device became large. Moreover, when the incident angle was made large, it was necessary to use each of the s-polarized light component and the p-polarized light component in a low transmittance region. Inevitably, this caused a problem that the intensity of light taken out was reduced.

SUMMARY OF THE INVENTION

The present invention is devised to solve the aforementioned problems and an object thereof is to provide a polarizing filter which can compensate for incident light to obtain light with a desired intensity ratio of the s-polarized light component to the p-polarized light component, and to provide an optical device using the polarizing filter.

A polarizing filter is configured as follows. First, a plurality of dielectric materials different from one another in refractive index with respect to a wavelength of incident light are classified into a first group and a second group so that the maximum value among the refractive indices of the dielectric materials belonging to the first group is lower than the minimum value among the refractive indices of the dielectric materials belonging to the second group. At least one layer of dielectric thin film selected from the dielectric materials belonging to the first group and at least one layer of dielectric thin film selected from the dielectric materials belonging to the second group are alternately laminated on a transparent flat substrate to form the laminate structure. Then, one layer of the dielectric thin film having a refractive index which is higher than the maximum value selected from the refractive indices of the dielectric materials belonging to the first group and which is lower than the minimum value selected from the refractive indices of the dielectric materials belonging to the second group is laminated on an outermost surface of the laminate structure. The dielectric thin film brought in contact with the surface of the substrate may be selected from the first or second group. Further, one to four layers of dielectric thin films selected from the first group and one to four layers of dielectric thin films selected from the second group are laminated alternately on the transparent flat substrate so that a sufficient effect can be obtained.

Preferably, a refractive index difference with respect to the wavelength of incident light between adjacent dielectric thin films selected from the dielectric materials belonging to the first and second groups respectively is in a range of from 0.15 to 1.2, both inclusively. Further, preferably, optical film thickness of each of the dielectric thin films is in a range of $0.25\lambda \pm 0.15\lambda$ in which $\lambda$ is a wavelength of incident light.

Still further, preferably, in an optical device using the polarizing filter, an angle of incidence on the polarizing filter is in a range of from 20 to 70 degrees.

The present disclosure relates to the subject matter contained in Japanese patent application No. 2000-261284 (filed on Aug. 30, 2000), which is expressly incorporated herein by reference in its entirety.

DESCRIPTION OF THE PREFERRED EMBODIMENT

An embodiment of the present invention will be described below.

It is generally known well that the transmitting or reflecting characteristic of a multilayer film structure constituted by an alternate laminate of high-refractive-index layers and low-refractive-index layers depends on polarized light. Generally, at least ten layers are required for perfectly transmitting or reflecting either of the s-polarized light component and p-polarized light component of incident light. When the degree of polarization is allowed to be relatively low as described above in the object of the present invention, such a multilayer film structure can be realized by a number of layers not larger than 9. In practical use, the stability of optical characteristic increases as the number of layers decreases, because there are more or less variations in the angle of incidence of light, variations in the refractive index of each film material, variations in the film thickness of each layer, and so on. Also taking economy or the like into account, a smaller number of layers are preferred. In the present invention, therefore, the target number of layers is set to be smaller than 10.

To find out a film configuration for achieving the foregoing object of the present invention, simulation has been made first by use of a method called matrix method. The method has been described in detail in the reading "Optical Thin Film" (The Nikkan Kogyo Shinbun Ltd.) written by H. A. Macleod.

Figure 1:
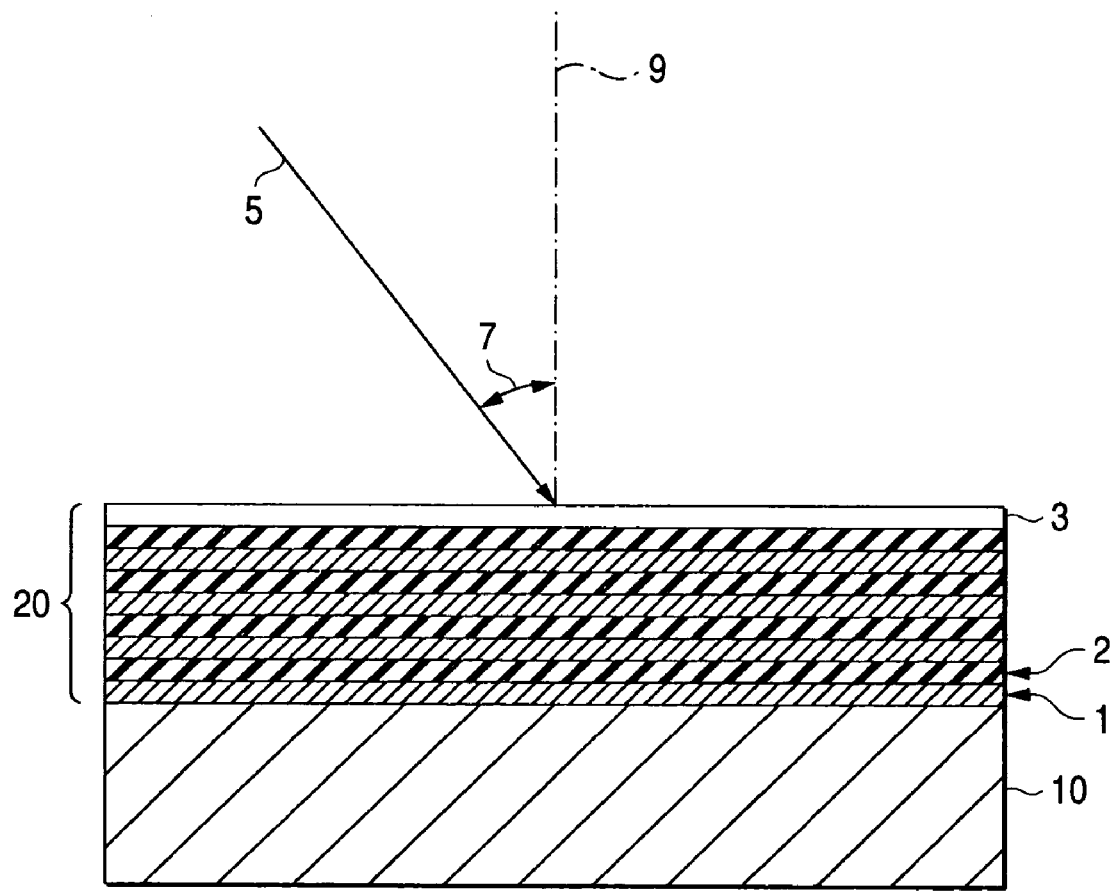
FIG. 1 is a schematic sectional view of a polarizing filter according to the present invention.

According to this simulation, the inventors of the present application have found out a multilayer film configuration from which light in a state of non-polarized light with the transmittance of the s-polarized light component equal to the transmittance of the p-polarized light component can be made to exit when a laminate structure 20 of dielectric films is provided on a substrate 10 as shown in FIG. 1 and the incident angle 7 of incident light 5 in which the intensity ratio of the s-polarized light component to the p-polarized light component is in a range of from 1:1 to 5:1 with respect to a certain wavelength is set. Similarly, the inventors have found out a multilayer film configuration by which non-polarized light with a certain wavelength can be polarized into light in which the transmittance ratio of the s-polarized light component to the p-polarized light component is in a range of from 1:1 to 1:5. The multilayer film configuration is basically made in such a manner that one to four layers of high-refractive-index dielectric thin films 1 and one to four layers of low-refractive-index dielectric thin films 2 are laminated alternately on the substrate 10 and that one dielectric thin film 3 having a refractive index intermediate between the refractive indices of the two kinds of dielectric thin films 1 and 2 is laminated as an uppermost layer on the alternate laminate of the two kinds of dielectric thin films 1 and 2. Configuration may be made in such a manner that the dielectric thin film laminated first on the substrate is one of the low-refractive-index dielectric thin films. The high-refractive-index dielectric thin films may be constituted by a group of a plurality of dielectric materials different in refractive index, and the low-refractive-index dielectric thin films may be also constituted by a group of a plurality of dielectric materials different in refractive index. In this case, the refractive index of the dielectric in the uppermost layer is set so as to be lower than the minimum refractive index in refractive indices of the high-refractive-index dielectric materials and higher than the maximum refractive index in refractive indices of the low-refractive-index dielectric materials.

When the incident angle 7 of light with respect to a normal line 9 on a surface of the polarizing filter is selected to be in a range of from 20 to 70 degrees, the aforementioned transmittance ratio can be obtained. Preferably, the incident angle 7 is selected to be not higher than 45 degrees so that the size of a housing for an optical device can be kept small when the polarizing filter is applied to the optical device.

In the present invention, the flat transparent substrate 10 is not particularly limited. The surface of the substrate, however, needs to be optically flat because an optically coherent effect is used.

Examples of the dielectric materials which can be used in the present invention may include: metal oxides such as titanium oxide, tantalum oxide, zirconium oxide, niobium oxide, magnesium oxide, silicon oxide, ytterbium oxide, hafnium oxide, aluminum oxide, etc.; and metal fluorides such as magnesium fluoride, calcium fluoride, lithium fluoride, etc.

The method of forming each of the transparent dielectric thin films used in the present invention is not specifically limited. Any method selected from various kinds of film-forming methods such as a vacuum evaporation film-forming method, a sputtering film-forming method, a sol-gel film-forming method, a chemical vapor-phase deposition method (CVD method), an ion-plating method, and so on can be used.

Some examples are as follows.

EXAMPLE 1

A non-alkali glass substrate with a size of 100 mm×100 mm×1.1 mm thick was set in a vacuum evaporation apparatus provided with an oil-diffusion pump. The vacuum chamber in the apparatus was exhausted to 0.0025 Pa by using the oil-diffusion pump. At the same time the exhaust was made, the glass substrate was heated to 250° C. by a substrate heating heater provided in the apparatus. Then, a 189 nm-thick titanium oxide film (refractive index: 2.13), a 286 nm-thick silicon oxide film (refractive index: 1.46) and a 268 nm-thick aluminum oxide film (refractive index: 1.62) were formed successively on the glass substrate to thereby produce a multilayer film for use in a polarizing filter. Incidentally, the optical film thicknesses of the titanium oxide film, the silicon oxide film and the aluminum oxide film were equivalent to 0.26λ, 0.27λ and 0.28λ respectively when the wavelength (λ) of incident light was 1550 nm.

Each film material was evaporated by electron-beam heating while the glass substrate was rotated in the condition that the distance from an evaporation crucible to the glass substrate was made 100 cm. For evaporation of the titanium oxide layer, an oxygen gas was introduced so that the pressure became 0.012 Pa. For evaporation of the silicon oxide layer and the aluminum oxide layer, no gas was introduced.

Figure 2:
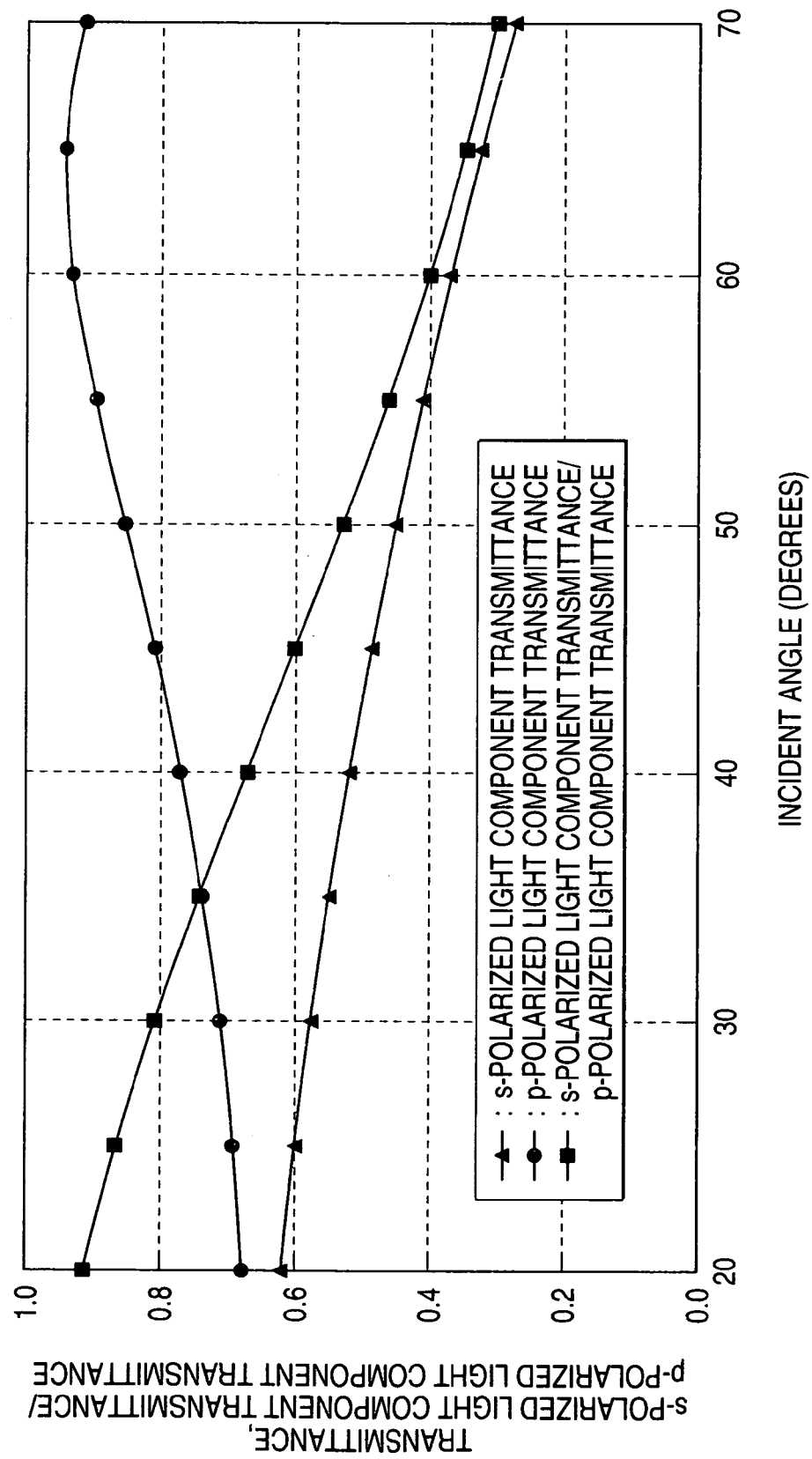
FIG. 2 is a graph showing transmission characteristic in an example of the multilayer film for use in the polarizing filter according to the present invention.

The transmittance of the s-polarized light component and the transmittance of the p-polarized light component in the case where light with a wavelength of 1550 nm was made incident on the film surface of the polarizing filter obtained as described above were measured while the incident angle (an angle between the incident light and the normal line on the surface of the polarizing filter) was changed variously in a range of from 20 to 70 degrees. FIG. 2 shows results of the measurement.

When the angle of incidence of light was made 38 degrees, the transmittance intensity ratio of the s-polarized light component to the p-polarized light component was 1:1.43. Hence, it is apparent that, when the polarizing filter obtained in Example 1 is used, incident light in a state in which the intensity ratio of the s-polarized light component to the p-polarized light component is 1.43:1 with respect to a wavelength of 1550 nm can be controlled into a non-polarized light state in which the intensity ratio of the s-polarized light component to the p-polarized light component is 1:1.

EXAMPLE 2

A 190 nm-thick titanium oxide film, a 322 nm-thick magnesium fluoride film (refractive index: 1.40) and a 286 nm-thick silicon oxide film were formed successively in the same manner as in Example 1 to thereby produce a multilayer film for use in a polarizing filter. The optical film thicknesses of the titanium oxide film, the magnesium fluoride film and the silicon oxide film were equivalent to $0.26\lambda$, $0.29\lambda$ and $0.27\lambda$ respectively when the wavelength ($\lambda$) of incident light was 1550 nm.

Incidentally, for evaporation of the titanium oxide layer, an oxygen gas was introduced so that the pressure became 0.012 Pa. For evaporation of the magnesium fluoride layer and the silicon oxide layer, no gas was introduced.

Figure 3:
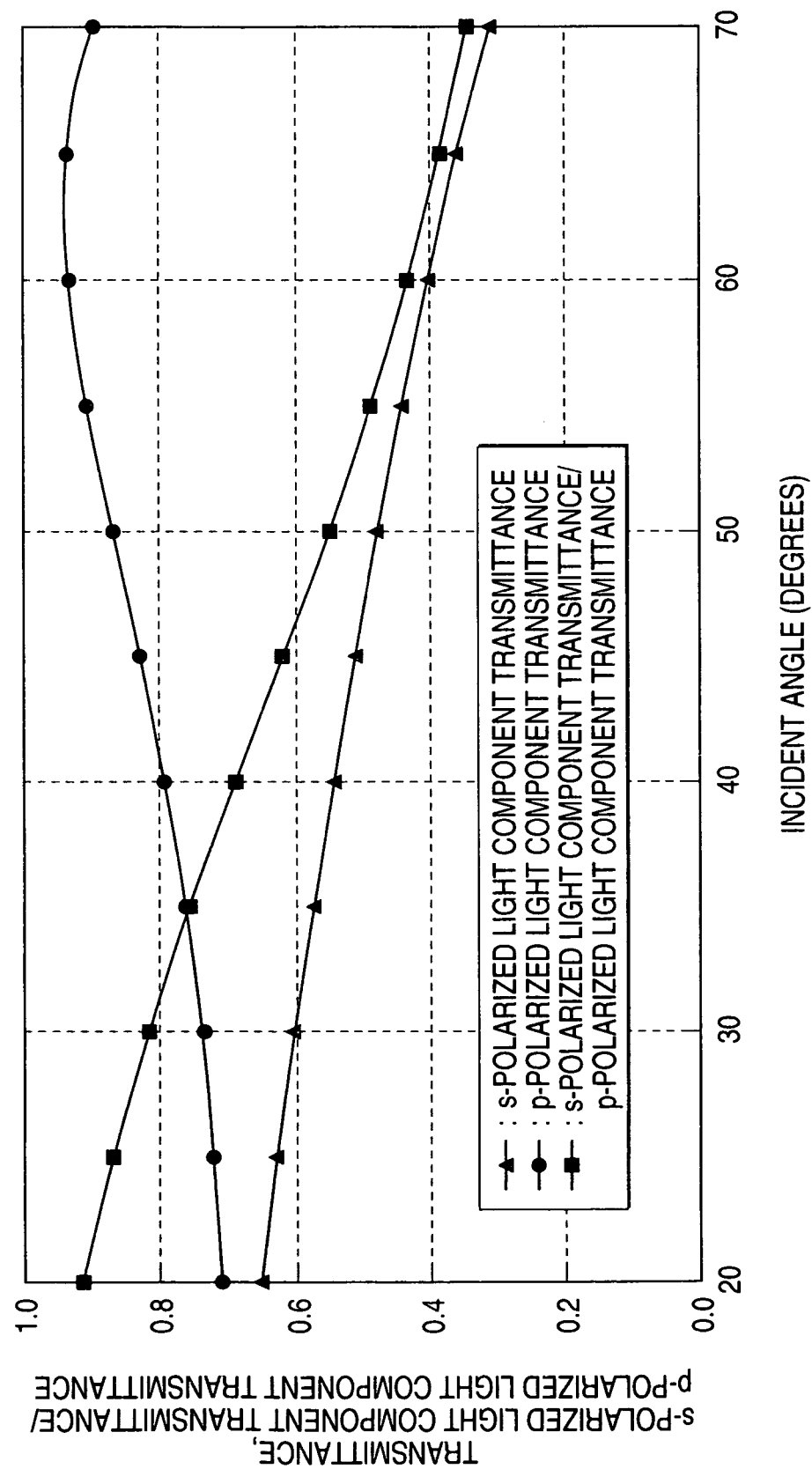
FIG. 3 is a graph showing transmission characteristic in another example of the multilayer film for use in the polarizing filter according to the present invention.

The transmittance of the s-polarized light component and the transmittance of the p-polarized light component were measured in the same manner as in Example 1. FIG. 3 shows results of the measurement.

When the angle of incidence of light was made 40 degrees, the transmittance intensity ratio of the s-polarized light component to the p-polarized light component was 1:1.43. Hence, it is apparent that, when the polarizing filter obtained in Example 2 is used, incident light in a state in which the intensity ratio of the s-polarized light component to the p-polarized light component is 1.43:1 with respect to a wavelength of 1550 nm can be controlled into a non-polarized light state in which the intensity ratio of the s-polarized light component to the p-polarized light component is 1:1.

EXAMPLE 3

A 180 nm-thick titanium oxide film, a 265 nm-thick silicon oxide film, a 180 nm-thick titanium oxide film, a 265 nm-thick silicon oxide film, a 180 nm-thick titanium oxide film, a 265 nm-thick silicon oxide film and a 242 nm-thick aluminum oxide film were laminated successively in the same manner as in Example 1 to thereby produce a multilayer film for use in a polarizing filter. The optical film thickness of each of the layers was equivalent to $0.25\lambda$ when the wavelength ($\lambda$) of incident light was 1550 nm.

Incidentally, for evaporation of the titanium oxide layer, an oxygen gas was introduced so that the pressure became 0.012 Pa. For evaporation of the silicon oxide layer and the aluminum oxide layer, no gas was introduced.

Figure 4:
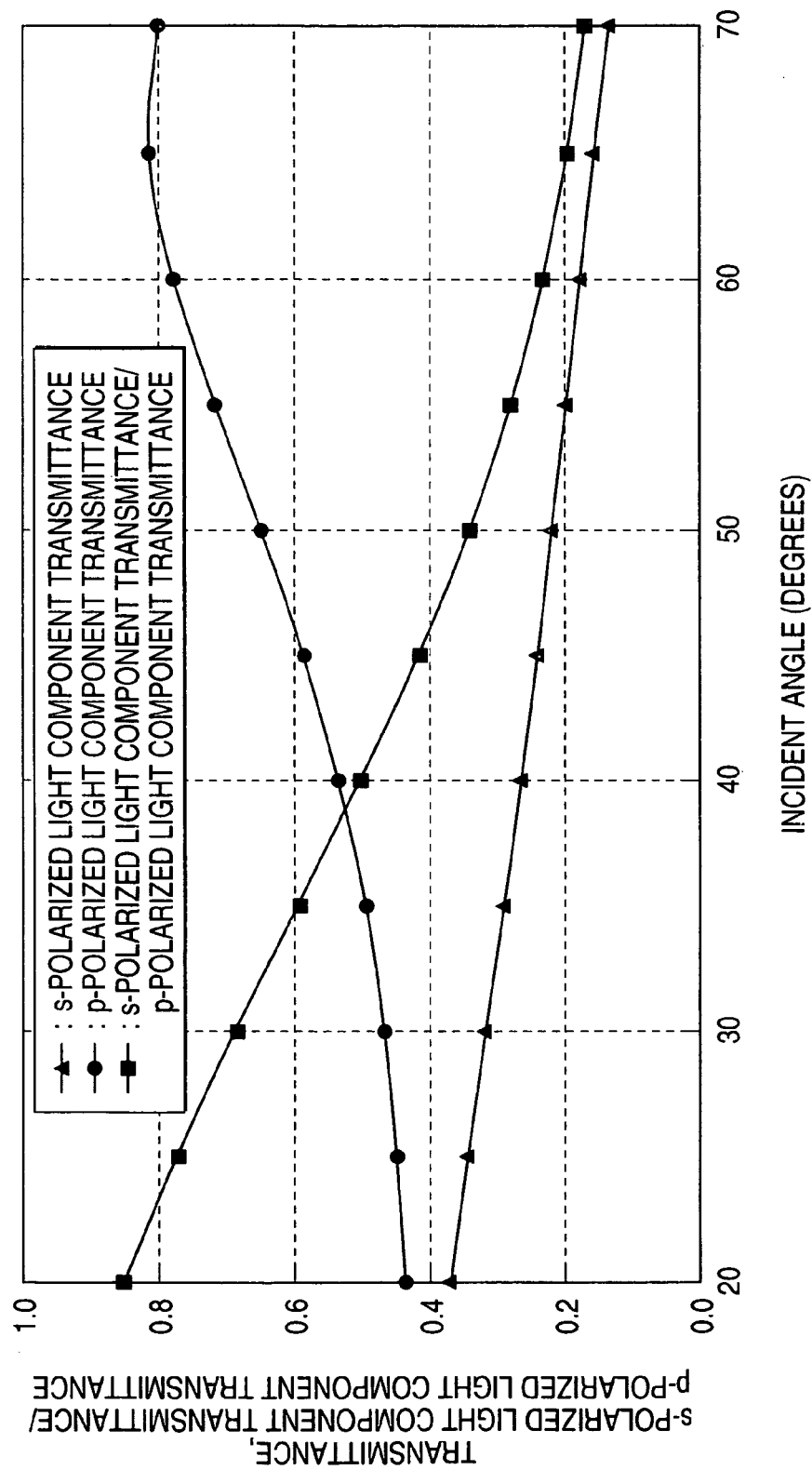
FIG. 4 is a graph showing transmission characteristic in a further example of the multilayer film for use in the polarizing filter according to the present invention.

The transmittance of the s-polarized light component and the transmittance of the p-polarized light component were measured in the same manner as in Example 1. FIG. 4 shows results of the measurement.

When the angle of incidence of light was made 40 degrees, the transmittance intensity ratio of the s-polarized light component to the p-polarized light component was 1:2. Hence, it is apparent that, when the polarizing filter obtained in Example 3 is used, incident light in a state in which the intensity ratio of the s-polarized light component to the p-polarized light component is 2:1 with respect to a wavelength of 1550 nm can be controlled into a non-polarized light state in which the intensity ratio of the s-polarized light component to the p-polarized light component is 1:1.

EXAMPLE 4

A 195 nm-thick titanium oxide film, a 287 nm-thick silicon oxide film, a 195 nm-thick titanium oxide film, a 287 nm-thick silicon oxide film, a 262 nm-thick aluminum oxide film were laminated successively in the same manner as in Example 1 to thereby produce a multilayer film for use in a polarizing filter. The optical film thickness of each of the layers was equivalent to $0.27\lambda$ when the wavelength ($\lambda$) of incident light was 1550 nm.

Incidentally, for evaporation of the titanium oxide layer, an oxygen gas was introduced so that the pressure became 0.012 Pa. For evaporation of the silicon oxide layer and the aluminum oxide layer, no gas was introduced.

Figure 5:
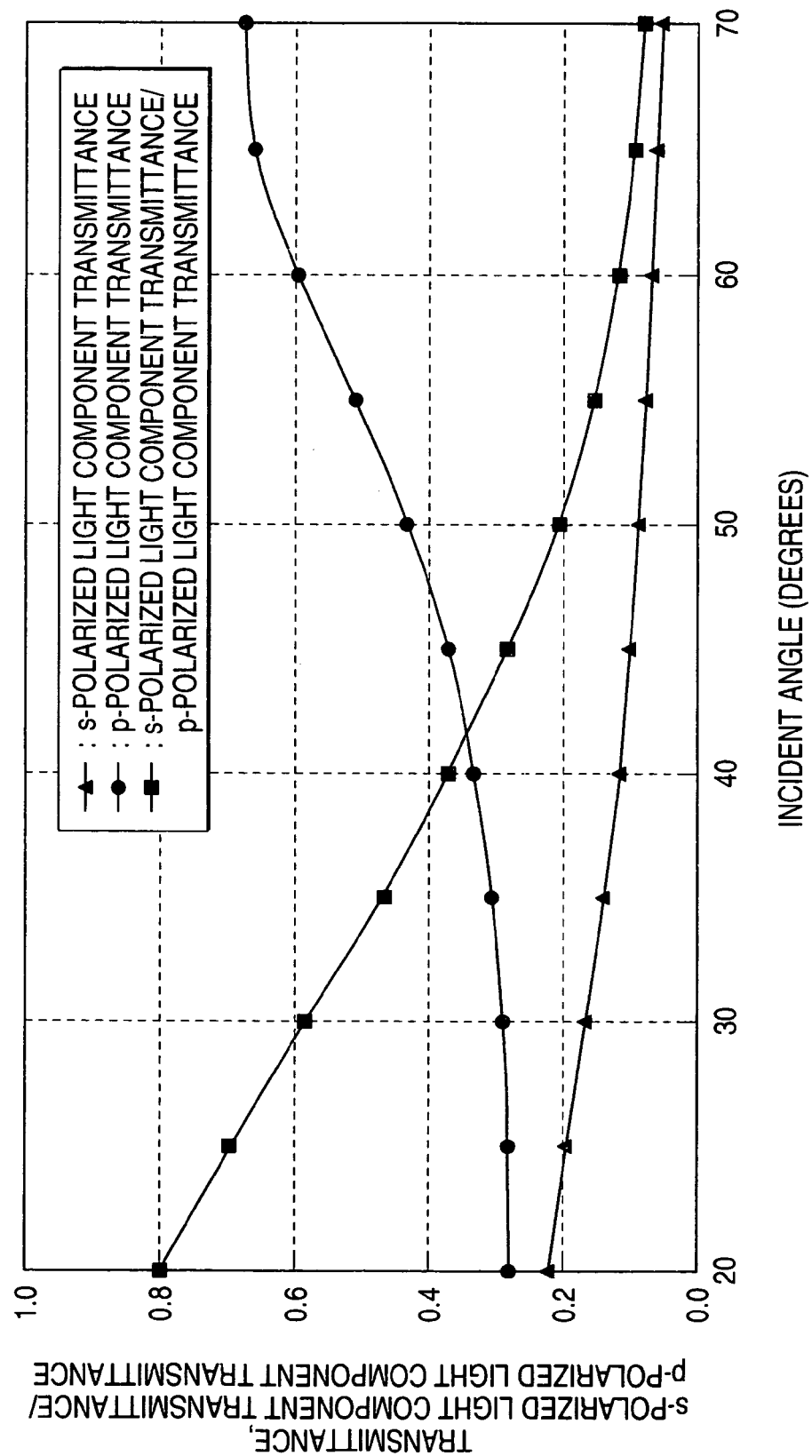
FIG. 5 is a graph showing transmission characteristic in a further example of the multilayer film for use in the polarizing filter according to the present invention.

The transmittance of the s-polarized light component and the transmittance of the p-polarized light component were measured in the same manner as in Example 1. FIG. 5 shows results of the measurement.

When the angle of incidence of light was made about 40 degrees, the transmittance intensity ratio of the s-polarized light component to the p-polarized light component was 1:3.57. Hence, it is apparent that, when the polarizing filter obtained in Example 4 is used, incident light in a state in which the intensity ratio of the s-polarized light component to the p-polarized light component is 3.57:1 with respect to a wavelength of 1550 nm can be controlled into a non-polarized light state in which the intensity ratio of the s-polarized light component to the p-polarized light component is 1:1.

EXAMPLE 5

A 265 nm-thick magnesium fluoride film, a 229 nm-thick aluminum oxide film, a 265 nm-thick magnesium fluoride film, a 229 nm-thick aluminum oxide film, a 265 nm-thick magnesium fluoride film, a 229 nm-thick aluminum oxide film and a 251 nm-thick silicon oxide film were laminated successively in the same manner as in Example 1 to thereby produce a multilayer film for use in a polarizing filter. The optical film thickness of each of the layers was equivalent to $0.24\lambda$ when the wavelength ($\lambda$) of incident light was 1550 nm.

Figure 6:
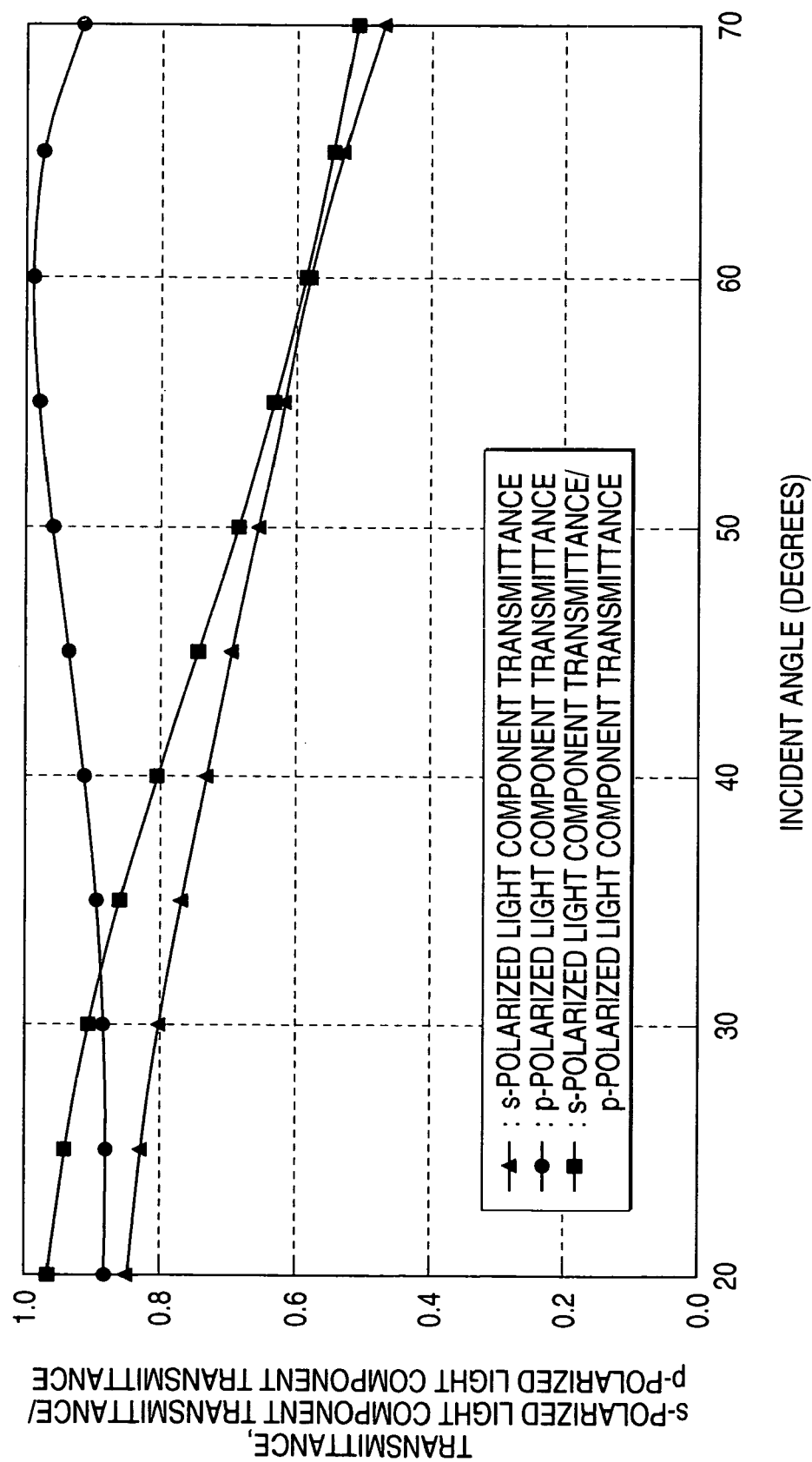
FIG. 6 is a graph showing transmission characteristic in a further example of the multilayer film for use in the polarizing filter according to the present invention.

The transmittance of the s-polarized light component and the transmittance of the p-polarized light component were measured in the same manner as in Example 1. FIG. 6 shows results of the measurement.

When the angle of incidence of light was made about 45 degrees, the transmittance intensity ratio of the s-polarized light component to the p-polarized light component was 1:1.33. Hence, it is apparent that, when the polarizing filter obtained in Example 5 is used, incident light in a state in which the intensity ratio of the s-polarized light component to the p-polarized light component is 1.33:1 with respect to a wavelength of 1550 nm can be controlled into a non-polarized light state in which the intensity ratio of the s-polarized light component to the p-polarized light component is 1:1.

EXAMPLE 6

A 190 nm-thick titanium oxide film, a 294 nm-thick magnesium fluoride film, a 207 nm-thick zirconium oxide film (refractive index: 1.95), a 279 nm-thick siliconoxide film and a 255 nm-thick aluminum oxide film were laminated successively in the same manner as in Example 1 to thereby produce a multilayer film for use in a polarizing filter. The optical film thickness of each of the layers was equivalent to $0.26\lambda$ when the wavelength ($\lambda$) of incident light was 1550 nm.

Incidentally, for evaporation of the titanium oxide layer and the zirconium oxide layer, an oxygen gas was introduced so that the pressure became 0.012 Pa. For evaporation of the magnesium fluoride layer, the silicon oxide layer and the aluminum oxide layer, no gas was introduced.

Figure 7:
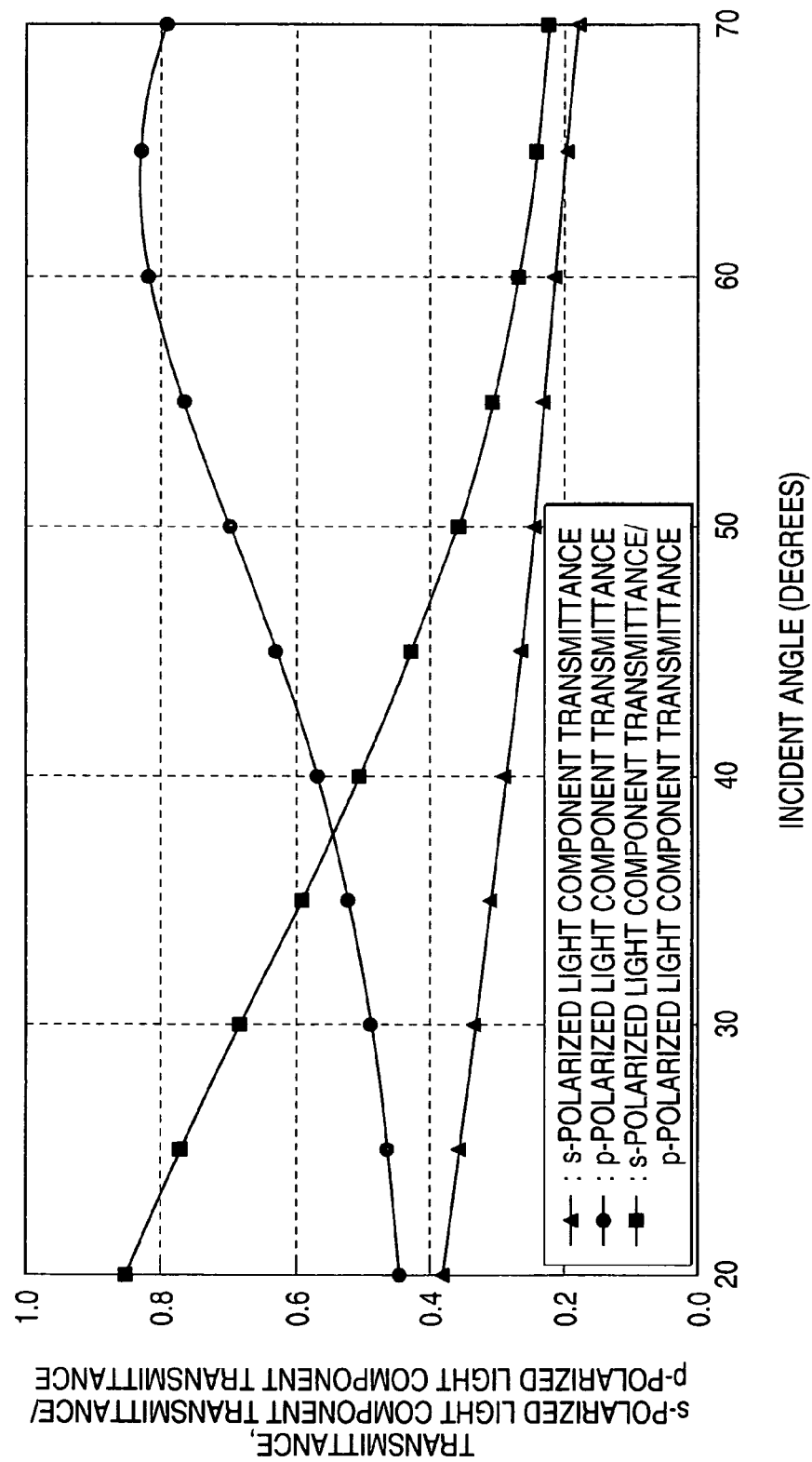
FIG. 7 is a graph showing transmission characteristic in a further example of the multilayer film for use in the polarizing filter according to the present invention.

The transmittance of the s-polarized light component and the transmittance of the p-polarized light component were measured in the same manner as in Example 1. FIG. 7 shows results of the measurement.

When the angle of incidence of light was made 30 degrees, the transmittance intensity ratio of the s-polarized light component to the p-polarized light component was 1:1.47. Hence, it is apparent that, when the polarizing filter obtained in Example 5 is used, incident light in a state in which the intensity ratio of the s-polarized light component to the p-polarized light component is 1.47:1 with respect to a wavelength of 1550 nm can be controlled into a non-polarized light state in which the intensity ratio of the s-polarized light component to the p-polarized light component is 1:1.

COMPARATIVE EXAMPLE 1

Figure 8:
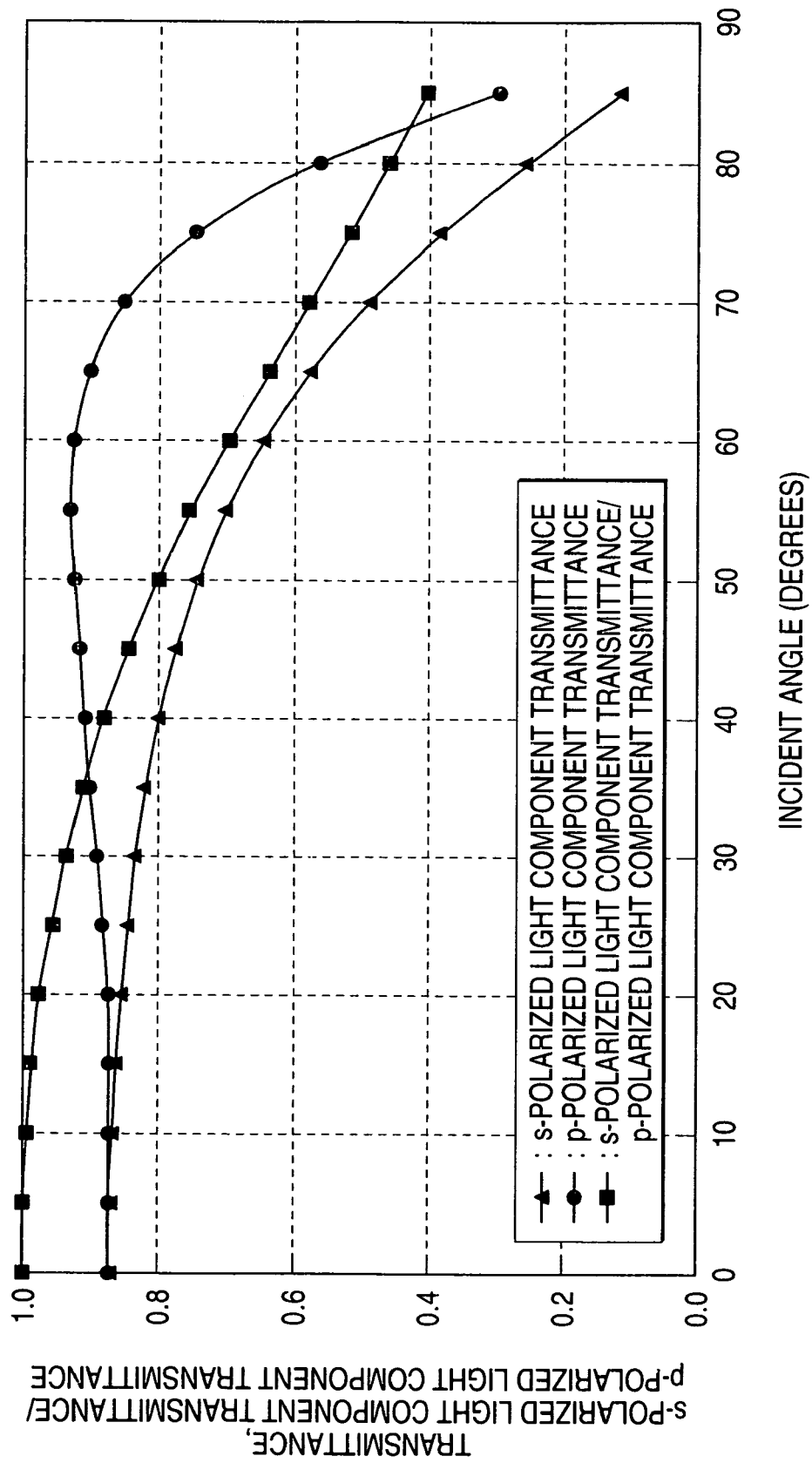
FIG. 8 is a graph showing transmission characteristic of a soda lime glass plate.

The transmittance of the s-polarized light component and the transmittance of the p-polarized light component in the case where light with a wavelength of 1550 nm was made incident on a soda lime glass plate with a size of 100 mm×100 mm×1.0 mm thick were measured while the angle of incidence was changed variously in a range of from 0 to 85 degrees. FIG. 8 shows results of the measurement.

It is apparent that, when the soda lime glass plate is used as a polarizing filter, the angle of incidence of light needs to be selected to be about 60 degrees in the case where incident light in a state in which the intensity ratio of the s-polarized light component to the p-polarized light component is 1.43:1 with respect to a wavelength of 1550 nm must be controlled into a state of non-polarized light in which the intensity ratio of the s-polarized light component to the p-polarized light component is 1:1, or the angle of incidence of light needs to be selected to be about 75 degrees in the case where incident light in a state in which the intensity ratio of the s-polarized light component to the p-polarized light component is 2:1 with respect to a wavelength of 1550 nm must be controlled into a state of non-polarized light in which the intensity ratio of the s-polarized light component to the p-polarized light component is 1:1.

This shows that the use of the soda lime glass plate as a polarizing filter in an optical device causes increase in size of a housing for the device, undesirably.

COMPARATIVE EXAMPLE 2

Figure 9:
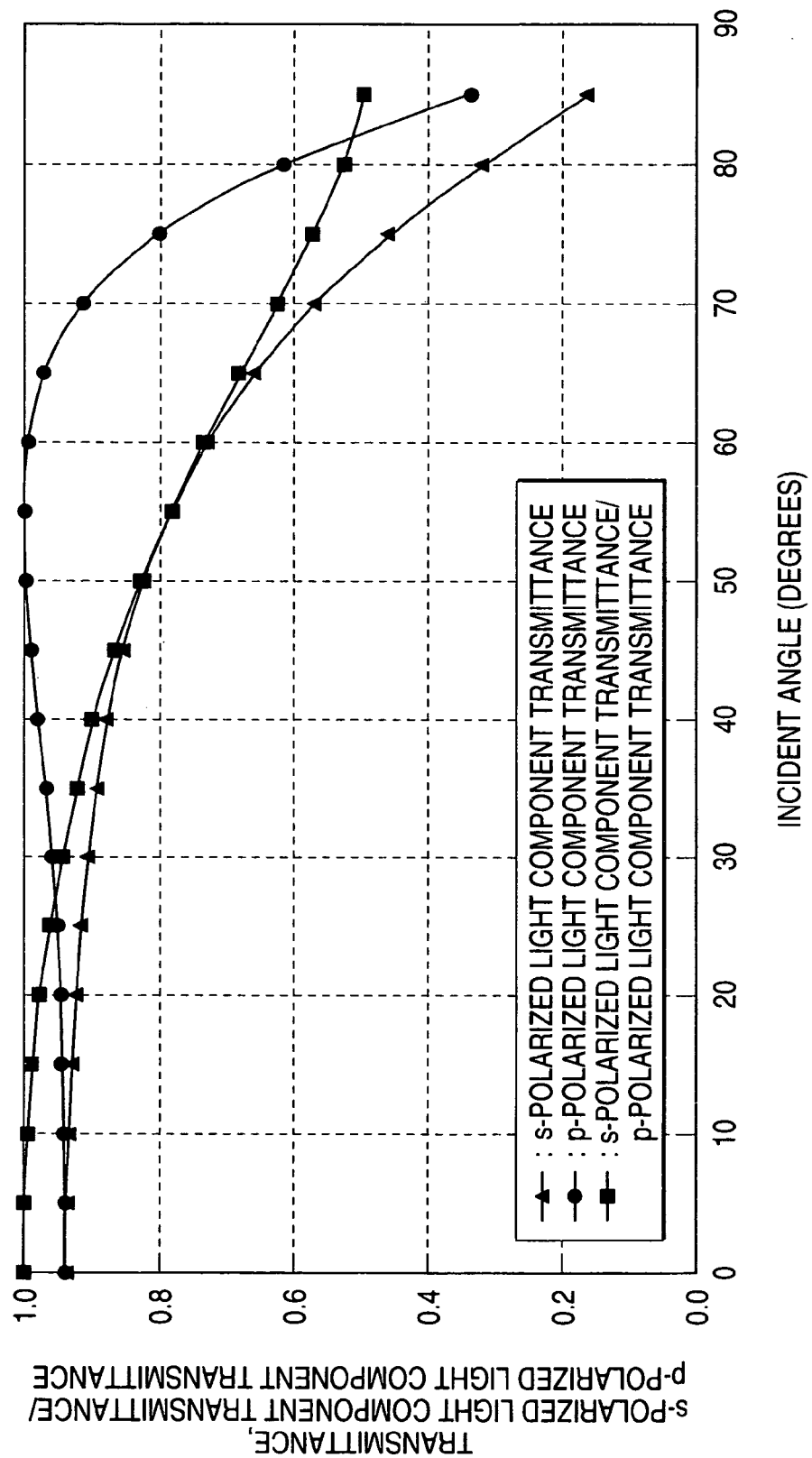
FIG. 9 is a graph showing transmission characteristic of a quartz glass plate.

The transmittance of the s-polarized light component and the transmittance of the p-polarized light component in the case where light with a wavelength of 1550 nm was made incident on a quartz glass plate with a size of 100 mm×100 mm×1.0 mm thick were measured while the angle of incidence was changed variously in a range of from 0 to 85 degrees. FIG. 9 shows results of the measurement.

It is apparent that, when the quartz glass plate is used as a polarizing filter, the angle of incidence of light needs to be selected to be about 62 degrees in the case where incident light in a state in which the intensity ratio of the s-polarized light component to the p-polarized light component is 1.43:1 with respect to a wavelength of 1550 nm must be controlled into a state of non-polarized light in which the intensity ratio of the s-polarized light component to the p-polarized light component is 1:1, or the angle of incidence of light needs to be selected to be about 85 degrees in the case where incident light in a state in which the intensity ratio of the s-polarized light component to the p-polarized light component is 2:1 with respect to a wavelength of 1550 nm must be controlled into a state of non-polarized light in which the intensity ratio of the s-polarized light component to the p-polarized light component is 1:1.

This shows that the use of the quartz glass plate as a polarizing filter in an optical device causes increase in size of a housing for the device, undesirably.

EFFECT OF THE INVENTION

When the multilayer film for use in the polarizing filter according to the present invention is used, light in which the intensity ratio of the s-polarized light component to the p-polarized light component is in a range of from 1:1 to 5:1 with respect to a certain wavelength can be compensated into a state of non-polarized light in which the transmittance of the s-polarized light component is equal to the transmittance of the p-polarized light component, or non-polarized light with a certain wavelength can be polarized into light in which the transmittance ratio of the s-polarized light component to the p-polarized light component is in a range of from 1:1 to 1:5. When the multilayer film for use in the polarizing filter according to the present invention is used, the angle of incidence of light can be reduced so that the multilayer film can be preferably used in an optical device. Moreover, the multilayer film for use in the polarizing filter according to the present invention is excellent in economy because the number of layers to be laminated can be reduced.

What is claimed is:

1. A polarizing filter having a laminate structure, comprising:
    a first group of dielectric thin film materials;
    a second group of dielectric thin film materials; and
    a third layer of dielectric thin film material,
    wherein a plurality of dielectric materials different from one another in refractive index with respect to a wavelength of incident light are classified into said first group and said second group so that a maximum value among the refractive indices of the dielectric materials belonging to said first group is lower than a minimum value among the refractive indices of the dielectric materials belonging to said second group;

wherein at least one layer of dielectric thin film selected from the dielectric materials belonging to said first group and at least one layer of dielectric thin film selected from the dielectric materials belonging to said second group are alternately laminated to form said laminate structure, said laminate structure being mounted on a transparent flat substrate beginning with a first layer adjacent to said transparent flat substrate;

wherein said third layer of the dielectric thin film having a refractive index which is higher than the maximum value selected from said refractive indices of the dielectric materials belonging to said first group and which is lower than the minimum value selected from said refractive indices of the dielectric materials belonging to said second group is laminated on an outermost surface of said laminate structure;

wherein said first layer includes the dielectric thin film selected from the dielectric materials belonging to the first group; and wherein an outer most layer has a refractive index which is 1.46.

2. A polarizing filter having a laminate structure, comprising:

a first group of dielectric thin film materials;

a second group of dielectric thin film materials; and a third layer of dielectric thin film material, wherein a plurality of dielectric materials different from one another in refractive index with respect to a wavelength of incident light are classified into said first group and said second group so that a maximum value among the refractive indices of the dielectric materials belonging to said first group is lower than a minimum value among the refractive indices of the dielectric materials belonging to said second group;

wherein at least one layer of dielectric thin film selected from the dielectric materials belonging to said first group and at least one layer of dielectric thin film selected from the dielectric materials belonging to said second group are alternately laminated to form said laminate structure, said laminate structure being mounted on a transparent flat substrate beginning with a first layer adj acent to said transparent flat substrate;

wherein said third layer of the dielectric thin film having a refractive index which is higher than the maximum value selected from said refractive indices of the dielectric materials belonging to said first group and which is lower than the minimum value selected from said refractive indices of the dielectric materials belonging to said second group is laminated on an outermost surface of said laminate structure;

wherein said first layer includes the dielectric thin film selected from the dielectric materials belonging to the first group;

the polarizing filter including seven layers, wherein the refractive indexes of the first to sixth layers are 1.40, 1.62, 1.40, 1.62, 1.40 and 1.62, respectively, and the refractive index of the outermost layer is 1.46.

3. A polarizing filter having a laminate structure, comprising:

a first group of dielectric thin film materials;

a second group of dielectric thin film materials; and a third layer of dielectric thin film material, wherein a plurality of dielectric materials different from one another in refractive index with respect to a wavelength of incident light are classified into said first group and said second group so that a maximum value among the refractive indices of the dielectric materials belonging to said first group is lower than a minimum value among the refractive indices of the dielectric materials belonging to said second group;

wherein at least one layer of dielectric thin film selected from the dielectric materials belonging to said first group and at least one layer of dielectric thin film selected from the dielectric materials belonging to said second group are alternately laminated to form said laminate structure, said laminate structure being mounted on a transparent flat substrate beginning with a first layer adjacent to said transparent flat substrate, said laminate structure consisting of the layers belonging to said first group and the layers belonging to said second group that are alternately provided;

wherein only one of said third layer of the dielectric thin film having a refractive index which is higher than the maximum value selected from said refractive indices of the dielectric materials belonging to said first group and which is lower than the minimum value selected from said refractive indices of the dielectric materials belonging to said second group is laminated on an outermost surface of said laminate structure;

wherein said first layer includes the dielectric thin film selected from the dielectric materials belonging to the first group;

wherein said polarizing filter polarizes non-polarized light into polarized light having an s-polarized light component and a p-polarized light component, the transmittance ratio of the s-polarized light component to the p-polarized light component being in the range of 1:1 to 1:5,said transmittance ratio of said polarizing filter being controllable to obtain a desired intensity ratio of the s-polarized light component to the p-polarized light component of said non-polarized light.

4. A polarizing filter according to claim 3, wherein a total number of layers of the first group dielectric thin film materials, the second group dielectric thin film materials, and the third layer of dielectric thin film material is not larger than seven.

5. The polarizing filter of claim 3, wherein the transmittance of said s-polarized light component is equal to the transmittance of said p-polarized light component.

* * * * *